May 13, 1969 — S. SPIEGELMAN — 3,444,043
INTERFERENCE WITH BIOLOGICALLY ACTIVE RNA FORMATION
Filed Sept. 30, 1966

INVENTOR
Solomon Spiegelman
BY Morrison, Marshall, Shapiro & Klose
ATTORNEYS

United States Patent Office 3,444,043
Patented May 13, 1969

3,444,043
INTERFERENCE WITH BIOLOGICALLY ACTIVE
RNA FORMATION
Solomon Spiegelman, Champaign, Ill., assignor to
University of Illinois Foundation, Urbana, Ill., a
corporation of Illinois
Filed Sept. 30, 1966, Ser. No. 583,365
Int. Cl. C12k 1/10
U.S. Cl. 195—28                                6 Claims

ABSTRACT OF THE DISCLOSURE

The formation of homologous intact viral RNA is interfered with by an inhibiting compound which interferes with the recognition mechanism between said RNA the specific replicase for said RNA.

---

Figure 1:
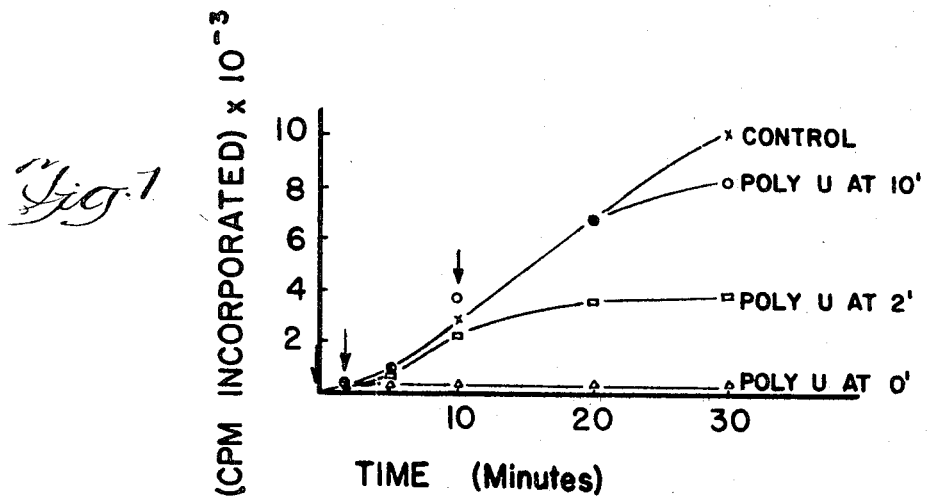

A United States Government contract or grant form or by the Public Health Service supported at least some of the work set forth herein.

This invention relates to the use of compounds which selectively interfere with the formation of biologically active nucleic acids such as viral RNA.

Before discussing this invention, a background of discoveries which preceded the invention shall first be described herein.

As used herein, the term "biologically active" includes material that possesses genetically competent characteristics or information essential to life or processes thereof. These biologically active materials are genetically competent and can transmit information to a system that will follow their instructions and translate them into biological sense.

Living organisms, including humans, animals, plants, and microorganisms, use biologically active nucleic acids in the processes of storing and transmitting translatable genetic or hereditary information or messages and in the synthesis of the large number of tissue and body proteins. Two nucleic acids which can function under proper conditions as transmitters of the genetic code are DNA (deoxyribonucleic acid) and RNA (ribonucleic acid). In the living organism, these nucleic acids are generally combined with proteins to form nucleo-proteins.

These DNA and RNA molecules consist of comparatively simple constituent nucleotides (nitrogen base, pentose sugar moiety, and phosphate groups) polymerized into chains containing hundreds to thousands of these nucleotide units generally linked together through chemical bonds formed between the constituent phosphate and sugar groups.

These nitrogen bases are classified as purines or pyrimidines. The pentose sugar is either ribose or deoxyribose. Phosphoric acid groups are common to both DNA and RNA. On complete hydrolysis, DNA and RNA yield the following compounds:

| DNA | RNA |
|---|---|
| Adenine (A) | Adenine (A) |
| Cytosine (C) | Cytosine (C) |
| Guanine (G) | Guanine (G) |
| Thymine (T) | Uracil (U) |
| Methylcytosine | |
| Hydroxymethylcytosine | |
| Deoxyribose | Ribose |
| Phosphoric acid | Phosphoric acid |

It should be noted that the bases adenine (A), cytosine (C), and guanine (G) are common to both DNA and RNA; the base thymine (T) of DNA is completely replaced by the base uracil (U) in RNA. Methylcytosine occurs in small amounts in various deoxyribonucleic acids of animal origin and in wheat germ. In the DNA of several bacteriophages, cytosine is completely replaced by hydroxymethylcytosine.

Hydrolysis of these nucleic acids under appropriate conditions liberates a group of compounds known is nucleotides; these nucleotides consist of a purine or pyrimidine bases linked to pentose sugar moiety, which sugar moiety is esterified with phosphoric acid. These nucleotides are the subunits from which polymeric nucleic acids are constructed.

The ribonucleic acid polynucleotide structure may be represented diagrammaticaly, for example, as follows:

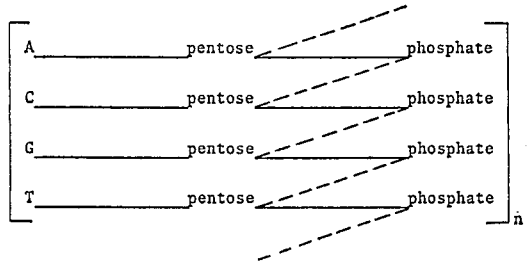

The dotted lines above represent ester groupings between one of the free hydroxyl groups of the pentose and of the phosphate groups. The subscript $n$ represents the number of repeating units which constitute the particular ribonucleic acid molecule.

Recent studies by chemists have shown that the DNA molecule has a doubly stranded chain which, when shown in three dimensions, has two chains intertwined in a double helix. Each chain consists of alternating nucleotides, there being ten nucleotides in each chain per rotation of the helix, this ten nucleotide chain being about 34A° in length. Both chains are right handed helices. These helices are evidently held together by hydrogen bonds formed between the hydrogen, nitrogen, and oxygen atoms in the respective chains. The structure of the DNA molecule as it relates to the sequence of these bases in the molecule is now being elucidated; these structural studies are important, since it is now generally believed that this sequence of bases is the code by means of which the DNA molecule conveys or transmits its genetic information.

Chemists have shown that RNA generally is a single-stranded structure that has in its backbone the 5-carbon sugar ribose instead of the 5-carbon deoxyribose sugar found in DNA. As in DNA, the different nucleotides are linked together through the phosphate groups to form a long chain and thus to form an RNA molecule of high molecular weight. The RNA molecules do not seem to be as highly polymerized as the DNA molecules, and although there is evidence of hydrogen bonding between the RNA bases in some viruses (e.g., reovirus), it is thought that no helical structure is involved. As with DNA, base sequence studies are now being made with RNA, for the sequence of bases in the RNA is the code by which the RNA molecule conveys or transmits its genetic information.

In genes, the repository of hereditary factors of living cells and viruses, specific genetic information resides in the nucleotide sequence appearing in the DNA and RNA molecules. These sequences are transmitted, encoded and reproduced in vivo by the complex enzymic systems present in living organisms. If no modification of the genetic DNA or RNA takes place, an exact duplicate or replicate of the nucleotide sequence is produced; this newly formed RNA or DNA in turn results in the production in vivo of an exact duplicate or replicate of a particular protein molecule. If, however, a change takes place in the DNA or RNA molecules, which change can be mediated by some mechanism such as radiation, a foreign chemical reactant, etc., a "mutation" takes place wherein the altered DNA or RNA molecules duplicate or replicate the "new" DNA or RNA and these in turn produce new or altered proteins as dictated by the altered nucleotide structure.

Copending application Ser. No. 535,596, filed Mar. 18, 1966, which is a continuation of application Ser. No. 509,458, filed Sept. 29, 1965, now abandoned, discloses a method and controlled system for synthesizing in vitro biologically active nucleic acids using an initiating amount of intact, biologically active (genetically competent) nucleic acid template, the replicase and the requisite nucleotides. With this method, one may synthesize, for example, a ribonucleic acid molecule (RNA) identical with the intact template continuously over extended periods until or unless one arbitrarily or selectively stops the synthesis. This self-replication involves the true and complete transmission and translation from the intact template to the nucleotides, whereby the nucleotides are assembled structurally in the identical sequence that characterizes the intact template. The product synthesized may be either selectively labeled (e.g., radioactive) or non-labeled and may be in a form that is free of detectable impurities or other materials with which it is otherwise found in Nature.

More specifically, application Ser. No. 535,596, now pending, discloses a controlled system that provides for the synthesis of intact, biologically active nucleic acid in a buffered aqueous in vitro enzymatic system from nucleotide bases, using a selected, intact, biologically active nucleic acid free of detectable levels of destructive material as the template (e.g., input template). When the system produces biologically active "replicas" (identical copies of the same molecular weight) of the nucleic acid template, the process is referred to as one involving "replication." The enzyme catalyst may be referred to as a "polymerase" or "replicase;" when the enzyme catalyst is an RNA-dependent RNA-polymerase, it is defined as a "replicase."

The process or system of the pending application is particularly well suited for synthesizing in vitro biologically active ribonucleic acid (RNA) from ribonucleotide base components (substrates) having high bond energy, using an intact, homologous (contains the information for its specific replicase) biologically active RNA template, a homologous replicase that selectively recognizes the structural program or message of the template, has catalytic activity for the synthesis of intact biologically active RNA from ribonucleotides, and is effectively free of detectable levels of ribonuclease activity and detectable levels of other destructive enzymological activity, and using divalent ions (Mg++) as a cofactor. The replication process may be stopped by a number of procedures, the simplest of which involves the cooling of the reaction to a temperature at which the rate of enzymic activity becomes negligible, e.g., 0° C.

The replicase for viral RNA can be obtained either by introducing a selected virus nucleic acid (e.g., bacteriophage) free of any existing protective proteinaceous coat into an uninfected host bacterium cell to synthesize an enzyme which is thought not to pre-exist in the host cell, or, preferably, by introducing an intact bacteriophage (virus particle) into the bacterium cell to synthesize this enzyme.

The injected or intruding viral RNA has a structural program that defines a message that is translated into enzyme protein and this message is conserved during the translation. This enzyme, a homologous replicase (RNA-dependent RNA-polymerase), is separated or isolated from the altered cell and is then purified to remove detectable levels of the usual concurrent ribonuclease activity and other destructive and confounding enzymological activity which is found in the bacterial cell.

The resulting partially purified enzyme, replicase, discriminately recognizes the intact homologous RNA genome of its origin and requires it as a template for normal synthetic replication. Thus, the replicase exhibits a unique and selective dependence on and preference for its homologous viral RNA in exhibiting viral RNA-polymerizing (synthesizing and/or replicating) activity. The replicase exhibits the unique and valuable ability to provide the replication of only intact viral RNA and does not provide for the replication of fragments or foreign sequences or incomplete copies of its own genome. The term "genome" refers to the entire complement of genes in a cell. The genes provide a repository of genetic information for living cells and viruses.

The nucleotide bases or substrate components for viral RNA replication should have sufficiently high bond energy for replication. Satisfactory replication of viral RNA has been achieved with four riboside triphosphates, namely, adenosine triphosphate (ATP), guanosine triphosphate (GTP), cytidine triphosphate (CTP), and uridine triphosphate (UTP).

In replicating infectious viral RNA in vitro, the pending application discloses purifying two different RNA replicases induced in a mutant Hfr strain of *Escherichia coli* (Q-13) by two serologically distinct RNA bacteriophages. The enzyme protein preparations were effectively free of detectable levels of interfering ribonuclease, phosphorylase, and DNA-dependent RNA-polymerase (transcriptase). These isolated enzymes (replicases) showed both a mandatory requirement for template RNA and an ability to mediate prolonged and extensive net synthesis of biologically active polyribonucleotide (RNA). The two replicases exhibited a unique discriminating selectivity in their response to added RNA. Under otherwise optimal conditions, both replicases were virtually inactive with heterologous RNA templates, including ribosomal and s-RNA of the host.

The replicase preparations described in copending application Ser. No. 559,933, filed June 23, 1966, are substantially free of detectable levels of virus particles and infectious viral RNA. In addition, the replicase may be purified so as to be substantially free of contaminants such as carbohydrates, lipids, poly-nucleotides and other proteins. The purified biologically active RNA polymerase (replicase) shown in application Ser. No. 559,933, which is substantially free of detectable levels of viral infectivity, and the infective RNA produced with the system and method are intact and are free of impurities or materials with which they are otherwise found in Nature. The synthesized viral RNA, for example, is free of the normally occurring protein coating present in the intact viral particle. The controlled RNA product produced with the system and method thus offers the advantage of being useful in experimental, laboratory, and commercial activities where one wishes to use a biologically active RNA that is effectively free of detectable confounding or extraneous materials. This controlled system also is free of detectable confounding or extraneous materials and thus provides an important means for studying the mechanism by which genetic changes and replication occur in life's processes and a means of understanding, modifying, or changing such processes or mechanisms.

There is good evidence that the replicase recognizes the particular sequence of nucleotides at the beginning and at the end of the biologically active viral RNA template during the course of replication. It is inferred from this recognition pattern that the intermediate portion of the RNA template is not essential to the direction of or instruction found in the replication mechanism studied. This suggests that the recognition sequences of nucleotides present at the beginning and end of a biologically active RNA template molecule can be selectively bonded to otherwise non-biologically active or non-viral RNA to produce a synthesized biologically active RNA product. It is thought that the RNA forms a circle and these two recognition sequences of the molecule overlap each other to provide double-stranded regions; such overlapped regions could afford, therefore, identification of the RNA molecule in a single, rapid scanning process.

An RNA template of an in vitro replicating system may be formed in situ. If one were, for example, to introduce foreign bases or nucleotides (e.g., analogues of known bases or nucleotides) into the replicating system, a mutant may be formed which would be the biologically active template for replication with those same bases or nucleotides; in such instances, one would be synthesizing mutants in vitro in a known way.

On a practical basis, the availability of the relatively pure replicase will allow the investigator to move into research areas not previously accessible. Thus one can now proceed to determine the effect of small or large changes in the replicase molecule upon its ability to synthesize RNA; and to determine the change in the biological activity of the RNA so produced by the altered replicase.

Being a protein, and, therefore, made up of a series of amino acids, the structure of the replicase can now be studied, and the relation of its structure to the structure of the RNA produced can give important information, vin-à-vis, structure-activity relationships. Since the replicase is a large molecule and subject to varying degrees of hydrolysis by chemical or enzymatic means, it will be of interest to determine the effect of such hydrolysis, whether they be comparatively minor or major, upon the biological activity of the molecule remaining. In addition, the protein molecule can be subjected to varying degrees of chemical change such as acetylation of its reactive amino or hydroxyl groups, halogenation, nitration, or sulfonation; reaction with nitrous acid should convert the free amino groups of the protein to hydroxyl groups, again with some change in activity.

The discovery of a method to produce an essentially pure biologically active RNA-dependent RNA polymerase should be useful in the study and/or preparation of products with anti-viral activity, anticancer activity, and hormone and/or enzyme activity. Such research could lead to important therapeutic advancements.

An altered replicase under certain conditions produces an altered RNA having altered virus properties or under ideal circumstances might have anti-virus properties. It may be possible to use this system by perhaps adding a new component to the bacteria-pure, RNA-virus system, which will result in a new replicase, which replicase system can be directed to produce anti-viral molecules.

In the reaction system discussed above, a replicase has been isolated. It is known that other disease causing viruses are also RNA molecules; for example, the viruses which cause tobacco and tomato mosaic disease, poliomyelitis, influenza, Newcastle Disease in poultry, and mumps, among others, are ribonucleic acid-containing proteins. The above-described discoveries point to the possibility that replicases for each of these RNA viruses could conceivably be derived from an appropriate system. The synthesis in vitro by such replicases in purified form should be an important advance in the study of the biochemistry of the diseases and in the preparation of vaccines and materials that interfere with the replication of viral RNA.

With a purified replicase in hand, it is possible to determine its particular amino acid structure. In addition, with the purified RNA in hand, it should be possible to determine the nucleotide sequence in the RNA, as well as its other structural characteristics. Determination of amino acid structure and coding to give the particlar RNA nucleotide sequence should be of importance in elucidating amino acid and nucleotide sequence correlation.

The intact viral RNA used in application Ser. No. 535,596 as initiating template was isolated from purified virus. It was obtained by deproteinizing the RNA with phenol and purifying the RNA on sucrose gradients. It was not obtained from the virus-infected bacteria but from the complete virus particle. The replicases were obtained by introducing viral RNA into an isolated mutant Hfr strain of E. coli (Q–13).

Using the in vitro system as referred to above, the template was produced, for example, by a factor of $10^{14}$. That is, for each molecule of intact template there was synthesized $10^{14}$ replicas. Further, 5 micrograms (e.g., $3 \times 10^{12}$ strands) of synthesized viral RNA were made every 20 minutes per 0.25 ml. of reaction mixture.

The unique preferences exhibited by the MS–2 and Qβ-replicases which surprised so many are now accepted. Thus, Weissmann and Feix (Proc. Nat'l Acad. Sci., U.S., 55, 1264 (1966) have confirmed this property with enzyme supplied from this laboratory, and August (Dept. of Molecular Biology, Albert Einstein College of Medicine, Yeshiva University, U.S.A.) found that purified Qβ-replicase which he prepared responds also only to Qβ-RNA. Further, the original (Haruna et al., Proc. Nat'l Acad. Sci., U.S. 50, 905 (1963)) isolation of MS–2 replicase has been successfully carried out to the stage of complete RNA dependence by Fiers (Lunteren Symposium on Regulatory Mechanisms in Nucleic Acid and Protein Biosynthesis (1966) and his colleagues. They confirmed the specific response to MS–2-RNA as well as the autocatalytic kinetics observed (Haruna et al., Science, 150, 3698 (1965)) when the reaction is initiated at template concentrations below saturation of the enzyme.

The fact that each replicase recognizes its own RNA genome provides an opportunity to examine the basis of the recognition interaction between a protein and a polynucleotide. An obvious device (obvious since the enzyme starts at the beginning and therefore would scan there first) would invoke the initial set of nucleotides, a possibility easily tested by challenging the replicase with fragments of homologous RNA as the template. If the presence of the beginning sequence is the sole requirement, half and quarter RNA fragments should be adequate to initiate synthesis. It was shown (Haruna, et al., Proc. Nat'l Acad. Sci., 54, 1189 (1965)) that this was not the case. Fragments of Qβ-RNA mediate a very slow reaction which soon terminates before ten percent of the input has been synthesized. Furthermore, the product is found (Haruna et al., Proc. Nat'l Acad. Sci., U.S., 55, 1256 (1966)) in a ribonuclease resistant structure, convertible to sensitivity by heat. This sort of structure is not observed (Haruna et al., Proc. Nat'l Acad. Sci. 55, 1256 (1966)) when replicase functions with intact Qβ-RNA and is extensively synthesizing biologically active RNA replicas (Haruna et al., Proc. Nat'l Acad. Sci., U.S. 55, 1256 (1966); Spiegelman et al., Proc. Nat'l Acad. Sci., U.S. 54, 919 (1965); Spiegelman et al., Proc. Nat'l Acad. Sci., U.S. 55, 1539 (1966); Pace, et al, Science, 153, 64 (1966)).

The inability of the replicase to copy fragments means that the enzyme can sense the difference between an intact and fragmented template, implying that some element of secondary structure of the RNA is involved. It was suggested (Haruna et al., Proc. Nat'l Acad. Sci., U.S. 54, 1189 (1965)) that a simultaneous decision on sequence and intactness could be made if the two ends were complementary and formed a double stranded region, sought for and recognized by the enzyme (replicase).

This mechanism has some interesting testable consequences in view of the recent demonstration (Haruna et al., Proc. Nat'l Acad. Sci., U.S., 55, 1256 (1966)) that the first five to 10 percent of Qβ–RNA synthesized is rich in adenine and poor in uracil. The proposed mechanism would then suggest that the enzyme (replicase) scans for a secondary structure formed by the pairing of two complementary regions, one predominant in A and the other in U. If this is the case, Qβ-replicase might be specifically inhibited by synthetic polynucleotides composed principally of either A or U or both. Conversely, polynucleotides containing mostly C or G should be relatively inert.

I have discovered methods of selectively interfering with the specific replicase of homologous intact biologically active RNA, such as viral RNA, by the use of an inhibiting compound which neutralizes the recognition mechanism between the replicase and the viral RNA.

This selective interference involves interacting (e.g., by some mechanism such as hydrogen bonding, charge-to-charge interaction, or the like) the inhibiting compound and the replicase, although it should be understood that such interaction is not intended to exclude the possibility that there may be some interaction between the viral RNA and interfering compound.

The particular example included herein involves the use of polyribonucleotide (e.g., homopolymer, copolymer or interpolymer) as the interfering compound. The polyribonucleotide should have more than 10 ribonucleotide units linked in a chain. However, non-polynucleotide compounds or equivalents thereof (e.g., linked in a chain) having essentially the same sequence of bases and/or same interaction characteristics (e.g., hydrogen-bonding properties or charge-to-charge capabilities) can also effect interference. That is, such non-polyribonucleotides may be synthesized with a variety of backbones. In particular, one might synthesize a molecule whose backbone is not the sugar-phosphate grouping found in the nucleotides, but might consist of analogues of the sugar and/or the phosphates; other non-polyribonucleotide molecules might have structures completely unrelated to these sugar-phosphates but be inhibitory due to their charge and space characteristics.

Previous work has established (Haruna et al., Proc. Nat'l Acad. Sci., U.S., 50, 905 (1963); Haruna et al., Proc. Nat'l Acad. Sci., U.S. 54, 579 (1965)) that RNA-replicases induced by RNA viruses require homologous and intact RNA for proper synthetic activity. Studies (Haruna et al., Proc. Nat'l Acad. Sci., U.S. 54, 1189 (1965); Spiegelman et al., Proc. Nat'l Acad. Sci., U.S., 55, 1539 (1966)) of the Qβ-replicase suggested that this enzyme recognizes a secondary structure formed by the pairing of two complementary sequences, initial and terminal, one containing predominantly A and the other U. In conformity with this model, it has been found and is shown herein that Qβ-replicase is specifically inhibited by synthetic polynucleotides composed principally of either A or U. Other polynucleotides, containing mainly or solely C or G are inert in that they do not inhibit the forfation of RNA. It is further shown herein that prior attachment of homologous template to enzyme eliminates the immediate inhibition by either poly A or U.

The discovery of specific template requirements and the work shown herein provide means for selective interference of viral replication such as described in application Ser. Nos. 509,458 and 535,596, mentioned above, and a new approach in the search for a novel and highly selective interference with viral replication via compounds which can neutralize the recognition mechanism between a replicase and its homologous template.

The experiments reported in the example, which follows, tested consequences of a specific model of the Qβ-replicase recognition mechanism which stemmed from the following observations: (1) Intact Qβ-RNA is necessary for the proper activation of the Qβ-replicase (Haruna et al., Proc. Nat'l Acad. Sci., U.S., 54, 1189 (1965)); (2) the base composition of the first 100 nucleotides is rich in A and poor in U as determined by a synchronized in vitro synthesis (Haruna etal., Proc. Nat'l Acad. Sci., U.S. 55, 1256 (1966)). The model then proposes that Qβ-replicase distinguishes one RNA molecule from another, and simultaneously determines intactness, by scanning for a secondary region formed by the pairing of two sequences, one predominantly A and the other correspondingly rich in U.

The fact that poly A and poly U inhibit the reaction whereas synthetic polynucleotides poor in A and U do not is consistent with this view. Prior addition of the template to the enzyme markedly reduces the inhibitory effect of both poly A and U, a result which is expected if the interaction is occurring at the enzymatic site used to recognize the homologous template.

The inability of Qβ-RNA to reverse the inhibition with time and the failure of either poly A or poly U to effect immediate displacement of Qβ-RNA from the enzyme-template complex suggest that the union between replicase and nucleic acid is comparatively irreversible. This may explain the unusually rapid approach to plateaus generally observed (Fiers et al., Lunteren Symposium on Regulatory Mechanisms in Nucleic Acid and Protein Biosynthesis (1966); Haruna et al., Science, 150, 3698 (1965); Pace et al., Proc. Nat'l Acad. Sci., U.S., 55, 1608 (1966)) in curves examining saturation of enzyme with template.

The observations set forth herein open up a new approach to achieve highly selective interference with viral multiplication. Further, one can envision an applicable chemo-therapeutic procedure for combating diseases in animals, including humans, wherein the inhibiting compound is administered to animals in a form such that it can enter the cells and destroying enzymes usually present cannot negate its activity.

The following example is illustrative of my invention. It will be understood, however, that the invention is not necessarily limited to the particular examples, materials, conditions or procedures described therein.

EXAMPLE

Methods and materials

The virus is Qβ and the host is *E. coli* Q13, an Hfr mutant lacking ribonuclease I and phoshporylase activities (Watanabe, Nihon Rinsho, 22, 243 (1964)). All the methods of preparing infected cells, purifications of the replicase, synthesis of radioactive substrates, and assay for enzyme activity, have been detailed previously (Haruna et al., Proc. Nat'l Acad. Sci., U.S., 50, 905 (1963); Haruna et al., Proc. Nat'l Acad. Sci., U.S., 54, 579 (1965); Haruna et al., Science, 150, 3698 (1965); Haruna et al., Proc. Nat'l Acad. Sci., U.S., 54, 1189 (1965); Haruna et al., Proc. Nat'l Acad. Sci., U.S., 55, 1256 (1966)).

Except for poly G, which was obtained through the kindness of Dr. Marianne Manago-Grunberg (Institute of Biology, Rothschild Foundation, Paris, France), the synthetic polynucleotides used in the present study were obtained from Miles Laboratories, Inc., Elkhart, Ind.

Results (a) The effect of homopolymers.—The effects of the four homopolymers on the activity of Qβ-replicase primed by intact Qβ-RNA is summarized in Table 1 below. It is evident that both poly A and poly U are extremely effective in inhibiting the reaction, whereas poly C and poly G are virtually without effect.

Table 1 below shows the effect of synthetic homopolymers on Qβ-replicase activity. In acquiring the data shown in Table 1, reactions were run under the standard conditions described by Haruna et al., Proc. Nat'l Acad. Sci., U.S., 54 579 (1965). Each reaction volume (0.25 ml.) contained the following in μmoles: Tris HCl, pH 7.4, 21; $MgCl_2$, 3.2; CTP, ATP, UTP, and GTP, 0.2 each and 40 μg. protein, 1 μg. of Qβ-RNA, 1 μg. of synthetic polynucleotide. The reaction was run for 20 min. at 35° C. and terminated by precipitation with 10% TCA (trichloroacetic acid) in an icebath, followed by washing on a membrane for liquid scintillation counting all as detailed by Haruna et al., in Proc. Nat'l Acad. Sci., U.S., 50, 905 (1963) and Proc. Nat'l Acad. Sci., U.S., 54, 579 (1965). $UTP^{32}$ synthesized according to the procedure of Haruna et. al., Proc. Nat'l Acad. Sci., U.S., 50, 905 (1963), was used at a level of $1 \times 10^6$ c.p.m./0.2 μmole.

TABLE 1

| Homopolymer | C.p.m. Incorporated | Percent Inhibition |
|---|---|---|
| Poly A | 562 | 85.5 |
| Poly U | 340 | 91.2 |
| Poly C | 3,867 | 0.2 |
| Poly G | 4,274 | 0 |
| Control | 3,878 | |

(b) The effect of synthetic copolymers.—In view of the striking differences observed, synthetic copolymers containing different combinations of effective and ineffective bases were also examined. The results are summarized in Table 2 below from which several facts emerge. No copolymer containing either C or G as a principal components shows any ability to inhibit. Even the two copolymers CA (1 to 10) and CU (1 to 10) are not as effective as the corresponding homopolymers of A and U. The only copolymer examined which approaches the inhibitory capacity of either poly A or poly U is the copolymer containing both of these bases.

Table 2 below shows the effect of synthetic copolymers on Qβ-replicase activity. Details of reactions and subsequent handling are as described in Table 1 above. Again, the Qβ-RNA and synthetic polynucleotide were present at 1 μg. each per reaction mixture. The numbers in parentheses of the first column indicate relative composition of the copolymer used. Thus, CA (10:1) indicates a ten to one ratio of C to A and CA (1:10) a one to ten C to A ratio. The enzyme used in these experiments had a specific activity about half that usually encountered.

TABLE 2

| Copolymer | C.p.m. Incorporated | Percent Inhibition |
|---|---|---|
| CA (10:1) | 1,655 | 3.2 |
| CA (1:10) | 1,305 | 23.7 |
| CA (1:1) | 1,470 | 14.0 |
| CU (10:1) | 1,810 | 0 |
| CU (1:10) | 652 | 61.9 |
| CU (1:1) | 1,714 | 0 |
| UG (1.2:1) | 1,555 | 9 |
| UA (3:2) | 256 | 85 |
| Control | 1,710 | |

(c) The comparative effectiveness of poly A and poly U.—The syntheses thus far described were carried out at the saturation point of template to enzyme (1γ to 40γ). It was of some interest to compare the inhibitory effectiveness of the two polymers by examining the reaction at lower polymer concentrations at varying levels of template. The results, shown in Table 3 below, reveal that poly U is the more effective of the two. Thus, at 0.2γ of Qβ-RNA, 0.1γ of poly A inhibits approximately 36%, whereas an equivalent amount of poly U achieves a 91% inhibition.

Table 3 below shows the percent inhibition at different levels of template. Reactions were run as described in Table 1 above, except that the Qβ-RNA was varied as indicated and the synthetic polynucleotides were present at 0.1 μg. per reaction mixture in all cases. The control reaction incorporated 3790 c.p.m. in 20 minutes in the absence of poly A and poly U. The numbers give the percent inhibition observed due to the synthetic polynucleotides.

TABLE 3

| | Qβ-RNA in μg. | | |
|---|---|---|---|
| | 1 | 0.6 | 0.2γ |
| Poly A | 40.7 | 37.2 | 35.5 |
| Poly U | 67.0 | 78.4 | 91.2 |

(d) The effects of poly A and poly U on the reaction with fragmented templates.—The abnormality of the reaction mediated by fragments of Qβ-RNA suggests that their interaction with replicase does not involve normal functioning of the recognition mechanism. Consequently, the ability of poly A and poly U to interfere with the limited synthesis observed under these conditions should be lower. That this expectation is realized is shown in Table 4 below. It will be noted that 0.1γ of poly A is able to achieve only a 10% inhibition in this case, whereas it achieved a 40.7% inhibition in the case of the intact template reaction. Similarly, 0.1γ of poly U has virtually no effect on the fragmentary action, whereas it exerted a 67% inhibition on the intact reaction. Finally, at polymer levels of 1γ, where over 90% inhibition is achieved with the intact reaction, only a 20% effect is observed with either poly A or poly U.

Table 4 below shows the interaction with fragmented templates. Reactions were run as described in Table 1 above. The Qβ-RNA used was fragmented from 28S to 12S, each reaction containing 1 μg.

TABLE 4

| | Polymer γ | C.p.m. Incorporated | Percent Inhibition |
|---|---|---|---|
| Poly A | 0.1 | 1,036 | 10 |
|  | 1.0 | 931 | 19.7 |
| Poly U | 0.1 | 1,246 | 0 |
|  | 1.0 | 941 | 19.0 |
| Control | 0 | 1,162 | |

(e) The effect of the order of addition on the inhibition.—If the inhibiting polymer and the template are attached to the same enzymatic site, it might be expected that the extent of the inhibition observed would be drastically influenced by the order in which template and polymer are added to the reaction mixture. In the course of these studies, an examination was also made of the effect of the four riboside triphosphates on complex formation between template and replicase to the enzyme. The results are summarized in Table 5 below for both poly U and poly A. The preincubation period with the indicated components was carried out for five minutes at 35° C. All missing components and UTP[32] were then added and the incubation continued for another five minutes at 35° C.

Table 5 below shows the effect of order of addition on inhibition by polynucleotides. Preincubation with the indicated components tested 5 minutes at 35° C. Missing components and UTP[32] were then added and the incubation continued for another 5 minutes. XTP refers to the four riboside triphosphates and the numbers in the corresponding columns indicate whether all (4), 3 (all except UTP), or none were present in the preincubation. All other details are as discussed above with respect to Table 1.

TABLE 5

| Preincubation Components | | | | Components Added Later | | | | Poly U C.p.m. | | Percent Inhib. | Poly A C.p.m. | | Percent Inhib. |
|---|---|---|---|---|---|---|---|---|---|---|---|---|---|
| RNA | Enzyme | XTP | Polymer | RNA | Enzyme | XTP | Polymer | − | + | | − | + | |
| + | + | 4 | − |  |  |  | + | 6,044 | 4,632 | 23 | 5,682 | 5,721 | 1 |
| + | + | 3 | − |  |  | 1 | + | 2,949 | 3,264 | 0 | 2,705 | 3,617 | 0 |
| + | + | 0 | − |  |  | 4 | + | 2,559 | 1,820 | 28 | 2,305 | 1,924 | 16 |
| − | + | 4 | + | + |  |  |  | 1,252 | 210 | 84 | 1,962 | 361 | 82 |
| − | + | 3 | + | + |  | 1 |  | 1,214 | 160 | 87 | 2,129 | 385 | 82 |
| − | + | 0 | + | + |  | 4 |  | 1,330 | 180 | 86 | 1,662 | 483 | 71 |
| + | − | 4 | + |  | + |  |  | 1,320 | 192 | 85 | 2,002 | 415 | 79 |
| + | − | 3 | + |  | + | 1 |  | 1,165 | 147 | 87 | 1,417 | 389 | 72 |
| + | − | 0 | + |  | + | 4 |  | 1,295 | 250 | 81 | 1,295 | 241 | 81 |
| + | + | 4 | + |  |  |  |  | 4,744 | 608 | 87 | 4,905 | 926 | 81 |
| + | + | 3 | + |  |  | 1 |  | 2,481 | 369 | 85 | 2,722 | 742 | 73 |
| + | + | 0 | + |  |  | 4 |  | 2,069 | 239 | 88 | 1,695 | 282 | 83 |

An examination of Table 5 above reveals that prior addition of the template does have a dramatic effect on the ability of either poly U or poly A to inhibit the reaction. Further, the four riboside triphosphates are not necessary to achieve reversal of the inhibitory effect. There is no significant difference in the response of the enzyme to either poly U or poly A in these experiments. The fact that the order of addition determines the outcome reinforces the conclusion that a specific interaction is being observed between the inhibiting polyribonucleotide and the site on the enzyme which recognizes the template.

(f) The kinetics of the inhibitory reaction.—It was of interest to examine in greater detail the events following addition of the polymer after the reaction was allowed to proceed for awhile with different levels of template. FIGURE 1 above shows the results observed at saturation concentration of template. It will be noted again (see Table 5 above) that the inhibition is virtually complete if the poly U is added at the same time as the template. On the other hand, addition of poly U or poly A after (two or ten minutes) the reaction has been initiated permits considerable synthesis of RNA. These results suggest that the polymer is unable to displace the template immediately from the enzyme. There is, however, a small but definite probability that displacement will occur and eventually the reaction is inhibited. The accompanying FIGURE 1 concerns the effect of adding poly U after the initiation of synthesis. Note from the zero time addition experiment of FIGURE 1 that the template is unable to displace the synthetic polynucleotide.

This same question was examined at template inputs below saturation, which leads to autocatalytic synthesis (Haruna et al., Science, 150, 3698 (1965)). The autocatalytic kinetics is presumably due in part to the fact that there are unoccupied enzyme molecules which become activated by new strands as they are completed. Presumably, the presence of poly U should make unoccupied replicase molecules unavailable to newly synthesized product. It would be expected then, that the addition of polynucleotide to the reaction mixture should lead to the immediate conversion of autocatalytic to linear synthesis. The accompanying FIGURE 2, which concerns the effect of adding poly U during autocatalytic synthesis, shows that this expectation is also realized. It will be seen from the control that autocatalytic synthesis exends over a period of about 40 minutes. The addition of poly U at either 13 or 22 minutes results in rapid conversion to linear kinetics. It should be noted that the amounts of poly U added corresponded to the amount of $Q\beta$-RNA present in the system at the time of addition and were lower than those used in the experiments of FIGURE 1. Hence, a more extensive period of linear synthesis is observed in the experiments of FIGURE 2.

In acquiring data for FIGURE 1, the conditions were as specified in Table 1 above with the following exceptions: 0.5 ml. reaction volume from which $50\gamma$ samples were removed; $Q\beta$-RNA was $1.2\gamma$ and the poly U added was $1\gamma$; the UTP$^{32}$ specific activity was such that the incorporation of 6,470 c.p.m. represents the synthesis of 1 $\mu$g. of RNA.

Figure 2:
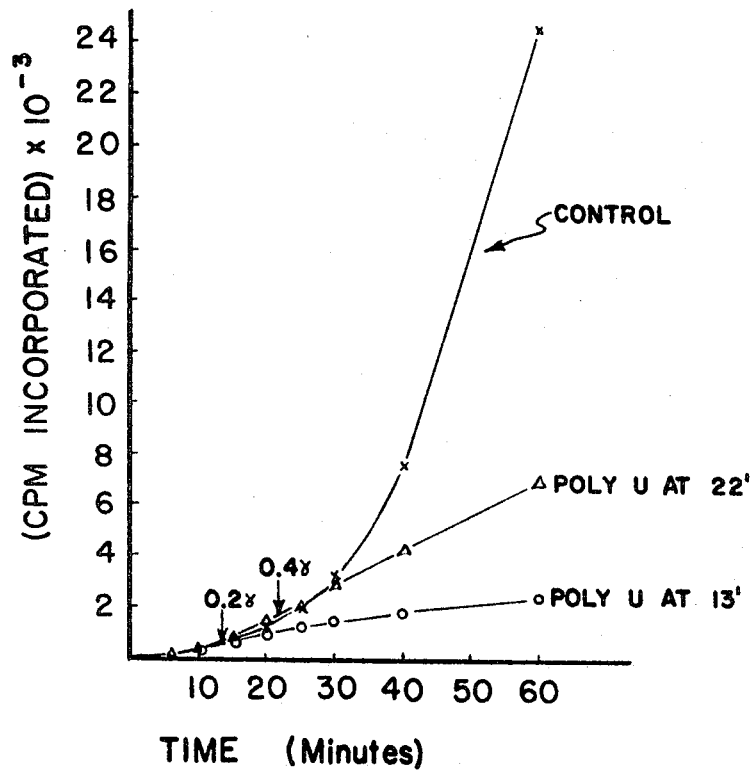

In obtaining the data for FIGURE 2, the conditions were as specified above with respect to FIGURE 1 with the following modifications: $0.2\gamma$ of $Q\beta$-RNA added initially and the amounts of poly U added at the indicated times corresponded to the concentration of $Q\beta$-RNA present at the time; the UTP$^{32}$ specific activity was such that the incorporation of 12,900 c.p.m. represents the synthesis of $1\gamma$ of RNA.

I claim:
1. The method of selectively interfering with replication in an in vitro system for replicating homologous intact biologically active RNA, which system includes said RNA; the specific replicase for said RNA which will recognize the intact RNA of its origin; the nucleotide base components adenosine triphosphate, guanosine triphosphate, cytidine triphosphate, uridine triphosphate; and divalent magnesium ions as an activating cofactor; said method comprising the step of injecting in said in vitro system an inhibiting compound which interferes with the recognition mechanism between the said specific replicase and said RNA, said inhibiting compound being comprised of polyribonucleotides of more than 10 ribonucleotides and composed principally of either adenine, uracil or admixtures thereof.

2. The method of claim 1 wherein said biologically active RNA is viral RNA.

3. The method of selectively interfering with the formation of homologus intact viral RNA in an in vitro system which includes said intact viral RNA; the specific replicase for said RNA which will recognize the intact RNA of its origin; and the nucleotide base components adenosine triphosphate, guanosine triphosphate, cytidine triphosphate, uridine triphosphate; and divalent magnesium ions as an activating cofactor; said method comprising the step of interacting in said in vitro system an inhibiting compound at the site of said replicase, said inhibiting compound comprised of polyribonucleotides of more than 10 ribonucleotides and composed principally of either adenine, uracil or admixtures thereof.

4. The method of claim 3 wherein said viral RNA is $Q\beta$-RNA.

5. The method of claim 3 wherein said interaction results from a union of said interfering compound and said replicase.

6. A specific replicase for homologous intact viral RNA united with inhibiting compound, said replicase being able to recognize the intact viral RNA of its origin and said inhibiting compound comprised of polyribonucleotides of more than 10 ribonucleotides and composed principally of either adenine, uracil, or admixtures thereof.

References Cited

Proc. Natl. Acad. Sci., vol. 50, pages 905–911 (1963).

ALVIN E. TANENHOLTZ, *Primary Examiner.*

U.S. Cl. X.R.

195—1.1, 62, 66; 260—211.5